(12) United States Patent
De Bot et al.

(10) Patent No.: US 6,694,515 B2
(45) Date of Patent: Feb. 17, 2004

(54) TRANSMISSION SYSTEM

(75) Inventors: Paulus George Maria De Bot, Eindhoven (NL); Henricus Joseph Cornelus Kuijpers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 132 days.

(21) Appl. No.: 09/790,342

(22) Filed: Feb. 21, 2001

(65) Prior Publication Data

US 2001/0021942 A1 Sep. 13, 2001

(30) Foreign Application Priority Data

Feb. 24, 2000 (EP) .............................. 00200645

(51) Int. Cl.[7] .............................................. H04N 7/173
(52) U.S. Cl. ....................... 725/105; 709/200
(58) Field of Search ................... 340/286.01, 286.02, 340/825.22; 725/105, 109, 110; 709/200, 202, 235; 348/1, 5.5, 7, 10; 386/46, 83; 455/2.01, 3.1, 4.1, 4.2

(56) References Cited

U.S. PATENT DOCUMENTS 5,758,257 A * 5/1998 Herz et al. .................... 455/2

6,243,141 B1 * 6/2001 Nio et al. ..................... 348/554

FOREIGN PATENT DOCUMENTS

| WO | 97/50250 | * 12/1997 |
| WO | WO99/65237 | 12/1999 |
| WO | WO00/01149 | 1/2000 |

* cited by examiner

Primary Examiner—Thomas Mullen
(74) Attorney, Agent, or Firm—Jack D. Slobod

(57) ABSTRACT

The transmission system according to the invention employs a transmitter (10) and a receiver (14). The receiver (14) employs a storage device (16) for storing content information (13) within the signal (11) received from the transmitter (10). The receiver further employs a control module (18) for controlling the storage device (16) in dependence on storage control information (15) associated with the content information (13), which storage control information (15) is also included in the signal (11). If the signal (11) is transmitted via a network (12), the transmitter (10) is preferably arranged for transmitting the signal (11) in dependence on the load of the network (12). In this way, content information (13) such as data, audio or video, can be transmitted during periods that the network (12) provides sufficient capacity, e.g., during the night.

10 Claims, 1 Drawing Sheet

TRANSMISSION SYSTEM

BACKGROUND OF THE INVENTION

1. Field of the Invention

The invention relates to a transmission system for transmitting a signal from a transmitter to a receiver, the receiver employing a storage device for storing content information comprised in the signal and a control module for controlling the storage device.

The invention further relates to a transmitter for transmitting a signal to a receiver, the signal employing content information.

The invention also relates to a receiver for receiving a signal from a transmitter, the receiver employing a storage device for storing content information within the signal and control module for controlling the storage device.

2. Description of the Related Art

A known transmission system is TiVo's Personal TV Receiver system, which is disclosed on Tivo's Internet site (http://www.tivo.com). In this known transmission system, the transmitter is a television signal transmitter broadcasting television signals and the receiver is a so called Personal TV receiver. This Personal TV receiver comprises storage device for storing up to 30 hours of audio/video content information within the television signal. Furthermore, the Personal TV receiver has control module for controlling the storage device, so that only a selection of the audio/video content information is stored in the storage device. The Personal TV receiver makes a nightly phone call to obtain up-to-date program information from the Tivo Personal TV Service. This program information enables the Personal TV receiver to identify and record audio/video content information that a user has specifically asked for or other audio/video content information that may be of interest to him. In this way, a selection of the audio/video content information is stored in the storage device and the user can watch (parts of) this selection whenever he desires to.

Under certain circumstances, it may be desirable that a service provider, who for instance has sponsored the storage device, is able to determine (part of) the content information which is stored in the storage device. In the known transmission system this is not possible.

SUMMARY OF THE INVENTION

Hence, it is an object of the invention to provide a transmission system that enables service providers or other interested parties to determine (part of) the content information which is stored in the storage device. This object is achieved in the transmission system according to the invention, which is characterized in that the signal further comprises storage control information associated with the content information, and the control module is arranged for controlling the storage device in dependence on the storage control information. By including storage control information in the signal, which storage control information is associated with the content information, a service provider who has control over the transmitter and over the signal transmitted by that transmitter, is able to define (parts of) the content information that need to be stored. This storage control information is thereafter used by the control module to control the storage device so that the defined (parts of) the content information included in the signal are indeed stored in the storage device. The content information may include data (e.g., news headlines, weather reports, stock market data or sports results) and/or audio (e.g., songs, news headlines, sports reports, voice mails, spoken books) and/or video (e.g., news, sports, movies, video clips). The storage control information may be included in the signal in any conceivable way and format, provided that the receiver is able to extract the storage control information from the signal and that the control module are able to use the storage control information for controlling the storage device.

A second embodiment of the transmission system according to the invention is characterized in that the transmission system further comprises a network, the signal being transmitted from the transmitter via the network to the receiver, the transmitter being arranged for transmitting the signal in dependence on the load of the network. Such networks, e.g., mobile phone networks or cable television (CATV) networks, normally have a load that strongly varies during the day. Often the load of these networks is relatively high during the day and the evening, while the load is relatively low during the night. Service providers, who have control over the transmitter and the network, normally have equipment which provides information relating to the load of the network. According to the present embodiment, this information is used by the transmitter to determine the times at which the signal can best be transmitted to the receiver, e.g., during the times that the load of the network is relatively low. Preferably, the transmitter is arranged for transmitting the signal during periods that the network is less than 70% loaded.

Furthermore, this embodiment has the additional advantage that a lower capacity of the network may be sufficient. Voice mails or video messages, which normally would be transmitted to the receivers at the request of the users of the receivers during periods that the load of the network is already relatively high, can now be transmitted under control of the service provider during periods that the load of the network is relatively low. This reduces the peak load of the network.

A third embodiment of the transmission system according to the invention is characterized in that the network comprises a mobile phone network. In mobile phone networks, the majority of the capacity is unused during the night, and this unused capacity can now be largely used for sending content information to the individual receivers. Normally, mobile network bandwidth is rather expensive. Therefore, content information which is transmitted to a receiver at a time instance chosen by a user of that receiver is expensive. However, content information transmitted at a time instance selected by the service operator (i.e., the mobile network operator), can be at virtually zero transmission costs, as the spectrum load is a priori known by the service operator at any time.

A fourth embodiment of the transmission system according to the invention is characterized in that the control module are arranged for retrieving content information from the storage device on request of a user. In this way, the user can access the stored content information at a convenient moment. An overview of the stored content information may be presented to the user by a user interface, which enables the user to select parts of the stored content information. Alternatively, the control module may be arranged in such a way that the user can access the stored content information only in the order in which it is stored. The control module may permit the user to delete some parts of the content information without reproduction (i.e., listening or viewing), while other parts such as advertisements or important messages from the service provider (e.g., service announcements) may not be deleted without reproduction.

A fifth embodiment of the transmission system according to the invention is characterized in that the control module are further arranged for collecting user preference information, the receiver comprising a transmit module for transmitting the user preference information to the transmitter. By the user preference information, which indicates what types of content information the user prefers, the service provider is able to determine what content information to include in the signal. Preferably, content information preferred by the user or by most users is included in the signal.

A sixth embodiment of the transmission system according to the invention is characterized in that the transmitter is arranged for including content information into the signal in dependence on the user preference information. This measure allows the transmitter to automatically include preferred content information into the signal. In a point to point network, such as a mobile phone network, content which is personalized for each individual receiver may then be transmitted to each individual receiver.

BRIEF DESCRIPTION OF THE DRAWING

The above object and features of the present invention will be more apparent from the following description of the preferred embodiment with reference to the sole FIGURE, which shows a block diagram of an embodiment of a transmission system according to the invention.

DETAILED DESCRIPTION OF THE PRESENTLY PREFERRED EMBODIMENTS

Figure 1:
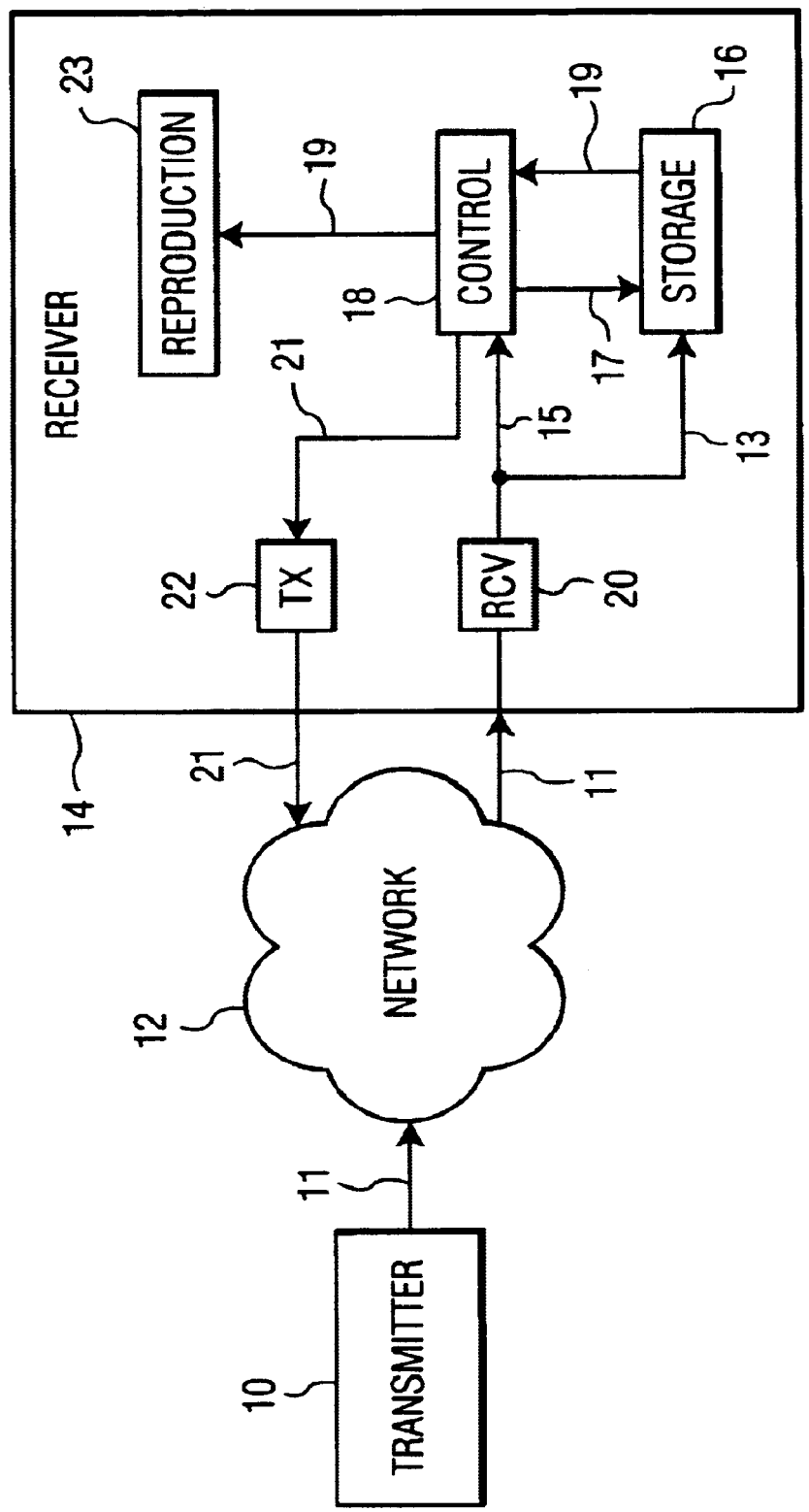

The FIGURE shows a block diagram of an embodiment of a transmission system according to the invention. In this embodiment a signal 11 is transmitted by a transmitter 10 via a network 12 to a receiver 14. The transmission system may comprise further transmitters 10, networks 12 and receivers 14. The transmitter 10, the network 12 and the receiver 14 can be of many different types depending on the particular application area. For example, in a mobile phone transmission system transmitter 12 may be a mobile switching center or a base station, the network 12 is a mobile phone network and the receiver 14 is most likely a mobile phone. Alternatively, in a CATV system, the transmitter 10 may be a headend, the network 12 is a CATV network and the receiver 14 maybe a settop box or a personal computer. In the receiver 14 the signal 11 is received by receive module 20. These receive module 20 is coupled to the control module 18 and to the storage device 16. The signal 11 comprises content information 13 and storage control information 15. The control module 18 are arranged for controlling the storage device 16 by control signals 17 in dependence on the storage control information 15. This storage control information 15 defines which (parts of the) content information 13 have to be stored by the storage device 16. The control module 18 translates the storage control information 15 into control signals 17, which instruct the storage device 16 to store the defined content information.

The storage device 16 may comprise a hard disk drive, a magnetic and/or optical tape unit, solid state memory, rewritable optical disk or the like. The control module 18 may comprise a microprocessor executing a control program. A user of the receiver 14 can access the stored content information by a user interface (not shown). A selection made by the user is used by the control module 18 to instruct the storage device 16 by the control signals 17 to retrieve the requested content information. This retrieved content information 19 is sent via the control module 18 to reproduction module 23, which reproduce the content information. The reproduction module 23 may comprise a display unit and/or a loudspeaker. On the basis of the selections made by the user, the control module 18 generates user preference information 21. This user preference information 21 indicates the content information 13 that is preferred by the user. The user preference information 21 is transferred from the control module 18 to transmit module 22, which transmit module 22 transmit the user preference information 21 via the network 12 to the transmitter 10. The transmitter 10 may use this user preference information 21 to include content information 13 into the signal 11, which content information 13 is preferred by the user. For instance, if the user always selects sports reports from the stored content information, the user preference information 21 will indicate this and the transmitter 10 may include more sports reports into the signal 11.

Alternatively, the user may request certain content information from the service operator (e.g., MP3 songs), which are then transmitted by the transmitter 10 to the receiver 14 at a time and speed determined by the service operator. Furthermore, the stored content information may be presented to the user free of charge (for instance when advertisements generate the revenues for the service operator) or at a certain fee (per-usage or subscription based), which fee may be charged by a bill. Stored content information may be made accessible once (and deleted after reproduction) or multiple times.

The scope of the invention is not limited to the embodiment shown. The invention is embodied in each new characteristic and each combination of characteristics. Any reference signs do not limit the scope of the claims. The word "comprising" does not exclude the presence of elements or steps other than those listed in a claim. Use of the word "a" or "an" preceding an element does not exclude the presence of a plurality of such elements.

What is claimed is:

1. A transmission system, comprising:
   a transmitter (10) for transmitting a signal (11) including content information (11) and storage control information (15) associated with the content information (13);
   wherein said receiver (14) includes
   a storage means (16) for storing the content information (13), and
   a control means (18) arranged for controlling a storage of the content information by said storage means (16) in dependence on the storage control information (15).

2. The transmission system according to claim 1, further comprising:
   a network (12), wherein the signal (11) is transmitted from said transmitter (10) via said network (12) to said receiver (14), and said transmitter (10) said arranged for transmitting the signal (11) in dependence on a load of said network (12).

3. The transmission system according to claim 2, wherein said transmitter (10) is arranged for transmitting the signal (11) during periods that the said network (12) is less than 70% loaded.

4. The transmission system according to claim 2, wherein said network (12) includes a mobile phone network.

5. The transmission system according to claim 1, wherein the content information (13) includes at least one of data, audio and video.

6. The transmission system according claim 1, control means (18) is further arranged for retrieving the content information (13) from said storage means (16) on a request of a user.

7. The transmission system according to claim 6, wherein said control means (18) is further arranged for collecting user preference information (21); and wherein said receiver (14) further includes a transmit means (22) for transmitting the user preference information (21) to said transmitter (10).

8. The transmission system according to claim 7, wherein said transmitter (10) is arranged for including the content information (13) into the signal (11) in dependence on the user preference information (21).

9. A transmitter (10) for transmitting a signal (11) to a receiver (14), the signal (11) comprising content information (13), wherein the signal (11) further comprises storage control information (15) associated with the content information (13).

10. A receiver (14) for receiving a signal (11) from a transmitter (10), the signal including content information (13) and storage control information (15) associated with the content information (13), the receiver (14) comprising:

storage means (16) for storing the content information (13) and control means (18) for controlling a storage of the content information (11) by said storage means (16) in dependence on the storage control information (15).

* * * * *